C. H. MYERS.
ENGINE STARTER.
APPLICATION FILED MAR. 1, 1912. RENEWED JUNE 21, 1913.
1,080,773.
Patented Dec. 9, 1913.
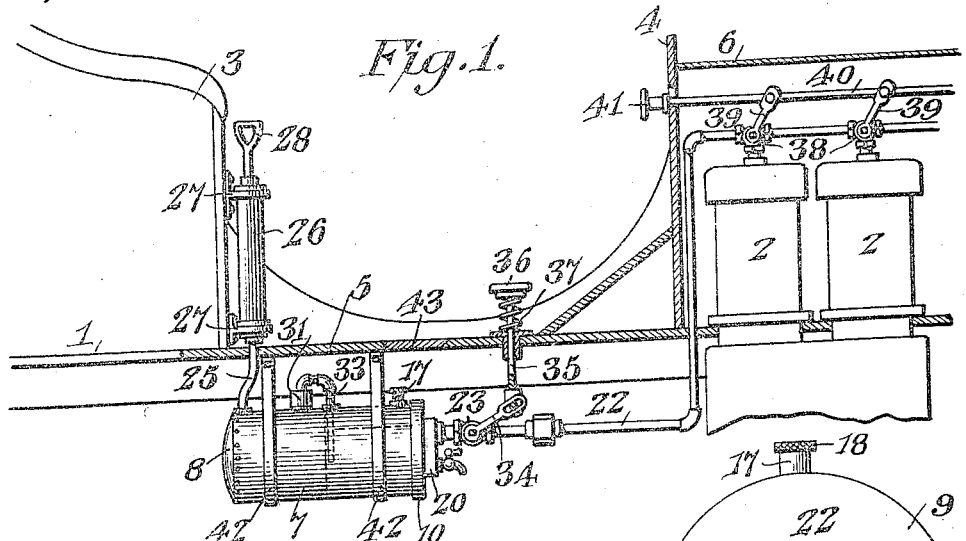
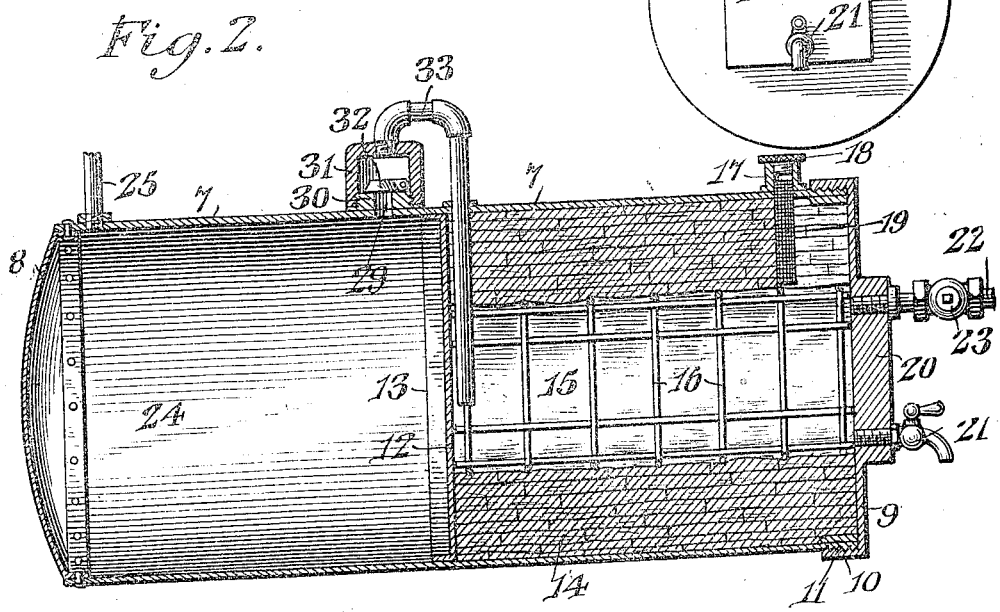
Charles H. Myers, INVENTOR
WITNESSES
Jas. K. McCathran
F. T. Chapman.
BY
*[signature]*
ATTORNEY

UNITED STATES PATENT OFFICE.

CHARLES H. MYERS, OF BUFFALO, NEW YORK.

ENGINE-STARTER.

1,080,773.   Specification of Letters Patent.   Patented Dec. 9, 1913.

Application filed March 1, 1912, Serial No. 680,801. Renewed June 21, 1913. Serial No. 775,131.

*To all whom it may concern:*

Be it known that I, CHARLES H. MYERS, a citizen of the United States, residing at Buffalo, in the county of Erie and State of New York, have invented a new and useful Engine-Starter, of which the following is a specification.

This invention has reference to improvements in engine starters, and its object is to provide a simple and efficient means readily installed in connection with an explosion engine, and more particularly the driving engine of an automobile, the invention being especially adaptable to automobiles of low price, because of the small cost of an installation in accordance with the present invention.

In the practical embodiment of the invention there is provided a single elongated casing preferably of cylindrical form with one head readily removable and with an intermediate wall dividing the casing into two chambers between which communication is had by means of a one way valve exterior to the casing. One chamber of the casing is utilized as a reservoir for air under pressure, the automobile being provided with a readily operable hand pump for producing the pressure. Within the other chamber of the casing there is introduced a cartridge of fibrous material with an axial passage therethrough maintained by a reticulated support, and the cartridge is held in place by the removable head of the casing, which head may be screwed on and off the body of the casing. The removable head carries an overflow cock and an outlet coupled to the engine or engines to be started and including a valve, which in turn is operable by the driver of the automobile, while the engine or engines are connected to the valved pipe and at each engine there is located a valve controllable by the driver of the automobile.

The invention will be best understood from a consideration of the following detailed description taken in connection with the accompanying drawings forming a part of this specification, with the further understanding that while the drawings show a practical form of the invention it may assume other practical embodiments, wherefore the invention is not limited to any strict conformity with the showing of the drawings, but the practical embodiment may assume other forms so long as such other forms do not mark material departures from the salient features of the invention.

In the drawings: Figure 1 is an elevation of the invention as applied to an automobile, the showing of the latter being fragmentary and partly in section. Fig. 2 is a longitudinal vertical section of a portion of the device of the present invention. Fig. 3 is an end view of the structure of Fig. 2 as viewed from the right hand end of said figure.

In the drawings there is shown a portion of an automobile 1, the showing including engines 2, the driver's seat 3, the dash 4, the flooring 5 of the driver's compartment, and a small section of the engine hood 6, all these parts being typical of any ordinary automobile.

In accordance with the present invention there is provided a cylinder 7, one head 8 of which may be permanently secured in place, and the other head 9 of which is provided with a peripheral axial flange 10 interiorly threaded to screw on to the threaded portion 11 of the open end of the cylinder, the walls of which cylinder at the open end may be thickened or reinforced when the cylinder is of small size, and, therefore, made of metal of thin gage.

At a point intermediate of the ends of the cylinder 7 within said cylinder there is lodged a partition 12, which partition may be provided with an axial flange 13 to firmly engage the inner wall of the cylinder and the partition is held in place by soldering or brazing, or in any other suitable manner.

Lodged in the end of the cylinder between the partition 12 and the head 9 is a cartridge of absorbent material indicated at 14, this absorbent material being usually fibrous material in the form of wicking. The fibrous material 14 does not occupy all the space within the chamber in which it is lodged, but there is formed axially through the cartridge a passage 15 by means of a woven wire fabric 16 of suitable diameter holding the wicking from collapsing into the passage 15. At a point near the head 9 the cylinder is provided with a filling nipple 17 normally closed by a screw plug 18 having its exposed edge milled, as is customary, for manipulation. This nipple 17 receives one end of a gauze tube 19 opening into the passage 15 so that a suitable hydrocarbon liquid introduced through the nipple

16 will flow into the space or passage 15, while the gauze 19 will prevent the inflow of particles of dirt and the like.

The head 9 is formed with a central enlargement or boss 20 which may be squared or similarly shaped for the application of a wrench or other suitable tool, and this thickened portion is utilized for the reception of an overflow faucet 21 and an outlet pipe 22, the latter including a valve 23 to which reference will presently be made.

The end of the cylinder 7 having the permanently closed head 8 incloses a chamber 24, which because of its function may be considered as a compressed air reservoir, and this chamber is entered by a pipe 25 coming from an air pump 26 provided with brackets 27 by means of which it may be secured to the front of the seat 3. The pump 26 has the usual piston rod provided with a handle 28 within easy reach of the operator of the vehicle, so that whenever desired air may be pumped into the reservoir 24 to maintain a supply of compressed air therewithin.

The wall of the reservoir 24 adjacent the partition 12 is formed with a passage or port 29 extending through a threaded boss 30 on the exterior of the cylinder 7 and this boss receives a valve casing 31, while fast to the outer end of the boss 30 is a valve 32, which may be an ordinary flap valve and constitutes a one-way or check valve opening away from the reservoir 24. Connected to the casing 31 is a pipe 33 continued into the chamber into which the cartridge 14 is introduced and leading to the space 15 within said cartridge.

The valve 23 is provided with a crank 34 connected at the end remote from the valve to a plunger 35 extending through the floor 5 of the automobile and terminating above the same in a foot plate 36, the stem of the plunger 35 being surrounded by a spring 37 between the foot plate and the floor of the automobile and tending at all times to maintain the foot plate 36 elevated but yielding to the pressure of the foot of the operator. The pipe 22 is continued from the valve 23 into the space covered by the hood 6 and communicates in series with valves 38 in turn connected to the explosion chamber of each engine 2. The several valves 38 are each provided with a crank arm 39 under the control of a sliding rod 40 which is continued through the dash 4 and there provided with a knob 41 within easy reach of the operator of the vehicle.

In practice the cylinder 7 is suspended below the floor 5 by hangers 42, either in the form of yokes or of any other suitable construction, or the cylinder 7 may be otherwise supported upon the vehicle 10, preferably located at about the position shown, and when so located the filling nipple 17 is reached by way of a trap 43 in the floor 5.

Let it be assumed that the installation is completed and that it is desired to charge the cartridge of fibrous material 14 with a suitable hydro-carbon liquid. The trap 43 is removed and the liquid is introduced into the filling nipple 17 after the plug 18 has been unscrewed. The liquid flows into the space 15 and is absorbed by the fibrous material 14 until the latter is saturated. The faucet 21 is allowed to remain open during the filling operation and as soon as the liquid begins to flow from the faucet it is an indication that the absorbent material has taken up all the liquid it will hold, so the filling operation may then cease. The faucet 21 is closed and the plug 18 is introduced into the filling nipple 17. The spring 37 maintains the valve 23 normally in the closed position, so that the operator may now grasp the pump handle 28 and reciprocate the pump piston until there has been caused within the chamber 24 the desired air pressure, and this air pressure is likewise established within the passage 15 because of the valve 32, but should for any reason the pressure within the chamber 24 be reduced below that of the passage 15, the valve 32 will close and remain closed thereby maintaining the pressure within the passage 15, even though the pressure within the chamber 24 should reduce to atmospheric pressure. Let it be further assumed that the pressure within the chamber 24 is as high as desired. The operator now wishing to start the engines pulls on the knob 41, thereby moving it away from the dash 4. This operation opens all the valves 38 and if the operator at the same time presses upon the foot plate 36 a communication is established between the passage 15 and the explosion chambers of the several engines 2, the pressure within the passage 15 being restored by the superior pressure within the chamber 24. If it be considered that the air initially within the pipe 22 has been forced therefrom by the air flowing from the passage 15 to the engine 16, then all the air passing to the cylinders has been charged with hydro-carbon vapor, it being understood that the hydro-carbon liquid absorbed by the fibrous or absorbent material is of a sufficiently volatile nature for the purpose. Now the knob 41 may be pushed back to its original position, thus closing all the valves 38 and the valve 34 may be released by the operator to the action of the spring 37, and this last named valve be thereby closed. The operator now causes the production of a spark in the usual manner, and the explosive compressed mixture in the proper one of the cylinders of the engines 2 is fired, thereby starting the engine in the usual manner, and as the engines are then in position to take up the charges in the normal way the cycle of operations is established without further drain upon the starting mechanism, which latter is in condition to respond to the next call upon it, and will respond to many calls without further operation of the pump 26. There is no likelihood of any explosive mixture reaching the chamber 24 to mix with the air therein, while that within the passage 15 is usually too rich to form an explosive mixture, and it is only when diluted by whatever air or other gases there may be within the cylinders of the engines 2 that the enriched air will respond to the spark to burn with explosive suddenness. However, when such conditions are established the valves 38 are closed, wherefore the flame cannot flash back to the passage 15.

What is claimed is:—

1. An engine starter installation comprising a casing having a compressed air reservoir at one end and a cartridge of absorbent material in the other end with a division wall completely separating the compressed air chamber from the cartridge receiving end of the casing, a one-way valve exterior to the compressed air chamber and provided with a pipe leading into the interior of the cartridge of absorbent material, an air pump connected to the casing to deliver air to the compressed air chamber, a pipe leading from the interior of the casing within the cartridge, a valve in said pipe, means for operating said valve at will, other valves in the pipe leading to respective engines, and a common manipulating means for the last named valves, the air pump, the operating means for the first named valve and the operating means for the valves leading to the engines being all associated within ready reach of an operator and each separately controllable from the others.

2. An engine starter installation comprising a compressed air reservoir, means within ready reach of the operator for compressing air into the reservoir, means associated with and connected to the reservoir for supplying hydrocarbon vapor, a duct leading therefrom and provided with a valve, means for the operation of the valve by the operator at will, and means operable at will for the introduction of the hydrocarbon vapor and air from the air reservoir in the form of an explosive mixture into the engine.

3. An engine starter for automobiles comprising a compressed air reservoir, means accessible from the driver's seat of an automobile for compressing air into the reservoir, means for supplying hydrocarbon vapor connected to and associated with the compressed air reservoir, a duct leading therefrom to the automobile engine, valves in the duct for connecting the same to the automobile engine, manually operable means connected to the valves and within ready reach of an operator on the operator's seat of the vehicle, and another valve in the duct between the means for supplying hydrocarbon vapor and the first named valves and provided with manipulating means within ready reach of an operator's seat on the vehicle.

4. An engine starter installation for automobiles comprising a compressed air reservoir, and means for supplying hydrocarbon vapor associated in one structure and adapted to be supported beneath the body of the automobile, a duct leading therefrom to the engine of the vehicle and provided with valves adjacent to the engine, manipulating means for the valves within ready reach of the operator's seat of the vehicle, and another valve in the duct adjacent to the reservoir and vapor supplying means and having manipulating means within ready reach of the operator's seat and distinct from the operating means for the first-named valves.

In testimony, that I claim the foregoing as my own, I have hereto affixed my signature in the presence of two witnesses.

CHAS. H. MYERS.

Witnesses:
JOHN H. SIGGERS,
DAVID R. WAGNER.